US011401645B2

(12) United States Patent
Lee et al.

(10) Patent No.: US 11,401,645 B2
(45) Date of Patent: Aug. 2, 2022

(54) LIFTER FOR LAUNDRY TREATING APPARATUS

(71) Applicant: LG ELECTRONICS INC., Seoul (KR)

(72) Inventors: Kilryong Lee, Seoul (KR); Byeongha Jeon, Seoul (KR); Jinseok Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 354 days.

(21) Appl. No.: 16/422,573

(22) Filed: May 24, 2019

(65) Prior Publication Data
US 2019/0276964 A1 Sep. 12, 2019

Related U.S. Application Data

(62) Division of application No. 15/398,921, filed on Jan. 5, 2017, now Pat. No. 10,633,779.

(30) Foreign Application Priority Data

Jan. 5, 2016 (KR) .................... 10-2016-0001209

(51) Int. Cl.
*D06F 37/06* (2006.01)
*D06F 37/04* (2006.01)

(52) U.S. Cl.
CPC ............ *D06F 37/065* (2013.01); *D06F 37/06* (2013.01); *D06F 37/04* (2013.01)

(58) Field of Classification Search
CPC ................................. D06F 37/06; D06F 37/065
See application file for complete search history.

(56) References Cited

U.S. PATENT DOCUMENTS 7,827,830 B2 * 11/2010 Kim .................... D06F 37/065
68/13 R
2004/0129036 A1 7/2004 Ratfisch
(Continued)

FOREIGN PATENT DOCUMENTS

CN 1414163 4/2003
CN 1779032 5/2006
(Continued)

OTHER PUBLICATIONS

Machine translation of KR 100802467 B1, dated Feb. 2008. (Year: 2008).*

(Continued)

*Primary Examiner* — Joseph L. Perrin
*Assistant Examiner* — Kevin G Lee
(74) *Attorney, Agent, or Firm* — KED & Associates, LLP

(57) ABSTRACT

A lifter for a laundry treating apparatus includes a first member mounted at an inner side of a drum; and a second member mounted on the first member and protruded toward an inside of the drum, wherein the first member includes a hook protruded and formed along a circumference of the first member, at least part of which is disposed to cover an inner circumferential surface of the drum when inserted into a fastening hole of the drum and then slid in one direction; and a shield protruded and formed at an inner side of the first member and configured to completely cover the fastening hole when the hook is inserted into the fastening hole and then slid in one direction.

16 Claims, 12 Drawing Sheets

(56) References Cited

U.S. PATENT DOCUMENTS

| | | | |
|---|---|---|---|
| 2005/0022565 A1 | 2/2005 | Jung et al. | |
| 2005/0097927 A1* | 5/2005 | Kim | D06F 23/06 68/24 |
| 2005/0252253 A1 | 11/2005 | Ahn | |
| 2007/0017259 A1 | 1/2007 | Cho et al. | |
| 2008/0282747 A1 | 11/2008 | Kim | |
| 2009/0071202 A1 | 3/2009 | Lee et al. | |
| 2009/0120139 A1* | 5/2009 | Bobed | D06F 37/06 68/142 |
| 2013/0081432 A1 | 4/2013 | Choi et al. | |
| 2014/0137425 A1 | 5/2014 | Kim et al. | |
| 2014/0366587 A1 | 12/2014 | Kegler et al. | |

FOREIGN PATENT DOCUMENTS

| | | |
|---|---|---|
| CN | 1906349 | 1/2007 |
| CN | 101161907 | 4/2008 |
| CN | 201065483 | 5/2008 |
| CN | 101316959 | 12/2008 |
| CN | 101451297 | 6/2009 |
| CN | 101668891 | 3/2010 |
| CN | 103031694 | 4/2013 |
| CN | 103114418 | 5/2013 |
| DE | 1 958 076 | 5/1971 |
| DE | 1585867 | 10/1971 |
| DE | 2 310 435 | 12/1974 |
| DE | 3317201 | 11/1984 |
| DE | 36 42 459 | 6/1988 |
| DE | 10 2008 018 044 | 10/2008 |
| EP | 0 351671 | 1/1990 |
| EP | 1 306 479 | 5/2003 |
| EP | 2053152 | 4/2009 |
| JP | S54-152333 | 10/1979 |
| JP | H06-152174 | 5/1994 |
| JP | 2003-126595 | 5/2003 |
| JP | 2010-526637 | 8/2010 |
| JP | 2019-50100 | 1/2019 |
| KR | 20-0358903 | 8/2004 |
| KR | 10-2004-0093601 | 11/2004 |
| KR | 10-0465724 | 1/2005 |
| KR | 10-0627908 | 9/2006 |
| KR | 10-2006-0127370 | 12/2006 |
| KR | 10-2007-0002284 | 1/2007 |
| KR | 10-0713946 | 5/2007 |
| KR | 100802467 B1 * | 2/2008 |
| KR | 10-0808204 | 3/2008 |
| KR | 10-1041802 | 6/2011 |
| KR | 10-2011-0088352 | 8/2011 |
| KR | 10-1208494 | 12/2012 |
| KR | 10-2013-0034911 | 4/2013 |
| KR | 10-2014-0084947 | 7/2014 |
| KR | 10-2014-0084951 | 7/2014 |
| KR | 10-1520610 | 5/2015 |
| KR | 10-2018-0135831 | 12/2018 |
| WO | WO-2007124804 A1 * | 11/2007 ............ D06F 39/10 |
| WO | WO 2008/140169 | 11/2008 |

OTHER PUBLICATIONS

Japanese Office Action (with English translation) dated Nov. 24, 2020 issued in JP Application No. 2018-554292.
Korean Office Action (with English translation) dated Dec. 1, 2020 issued in KR Application No. 10-2018-0160269.
Korean Office Action (with English translation) dated Dec. 1, 2020 issued in KR Application No. 10-2018-0160270.
Korean Office Action (with English translation) dated Dec. 1, 2020 issued in KR Application No. 10-2018-0160273.
Korean Office Action (with English translation) dated Dec. 1, 2020 issued in KR Application No. 10-2019-0068830.
Chinese Office Action (with English translation) dated Apr. 22, 2019 issued in CN Application No. 201710006431.2.
Japanese Office Action dated Mar. 30, 2021 issued in JP Application No. 2020-060118.
Chinese Office Action dated Apr. 6, 2021 issued in CN Application No. 201911258571.4.
Chinese Office Action dated Apr. 6, 2021 issued in CN Application No. 201911258542.8.
International Search Report dated Jan. 12, 2017 issued in Application No. PCT/KR2016/012808.
European Search Report dated May 24, 2017 issued in Application No. 17150288.3.
European Search Report dated Aug. 30, 2017 issued in Application No. 17150288.3.
Chinese Office Action (with English translation) dated Aug. 28, 2018 issued in CN Application No. 201710006431.2.
European Search Report dated Oct. 24, 2019 issued in EP Application No. 19185629.3.
United States Office Action dated Sep. 6, 2019 issued in U.S. Appl. No. 15/398,921.
Japanese Office Action dated Feb. 2, 2021 issued in JP Application No. 2019-091911.
Japanese Office Action dated Feb. 2, 2021 issued in JP Application No. 2019-091915.
Japanese Office Action dated Feb. 2, 2021 issued in JP Application No. 2019-091916.
U.S. Final Office Action dated Oct. 7, 2021 issued in U.S. Appl. No. 16/422,724.
Chinese Office Action dated Jul. 28, 2021 issued in CN Application No. 201911267126.4.
Japanese Office Action dated Aug. 23, 2021 issued in JP Application No. 2018-554292.
Chinese Office Action dated Sep. 15, 2021 issued in CN Application No. 201911259744.4.
Chinese Office Action dated Jan. 27, 2022 issued in CN Application No. 201911267126.4.
United States Office Action dated Mar. 31, 2022 issued in co-pending related U.S. Appl. No. 16/811,486.

* cited by examiner

LIFTER FOR LAUNDRY TREATING APPARATUS

CROSS-REFERENCE TO RELATED APPLICATION(S)

This is a Divisional Application of U.S. application Ser. No. 15/398,921, filed on Jan. 5, 2017, which, pursuant to 35 U.S.C. § 119(a), claims the benefit of the earlier filing date and the right of priority to Korean Application No. 10-2016-0001209, filed on Jan. 5, 2016, the contents of each of which is incorporated by reference herein in its entirety.

BACKGROUND

1. Field

The present disclosure relates to a lifter used for a laundry treating apparatus.

2. Background

A laundry treating apparatus may allow clothes, bedding, and the like (hereinafter, referred to as laundry) to be placed into a drum to remove contamination on laundry. The laundry treating apparatus may perform the processes of washing, rinsing, dehydration, drying and the like. The laundry treating apparatus may be divided into a top loading type and a front loading type based on the method by which laundry is placed into the drum. A front loading type washing machine may be referred to as a drum washing machine.

The laundry treating apparatus may be typically configured to include a body that forms an external appearance, a tub accommodated into the body, a drum rotatably mounted within the tub to accept laundry thereinto, and a detergent supply apparatus configured to supply detergent into the drum. When the drum is rotated by a motor in a state that washing water is supplied to laundry accommodated into the drum, dirt on the laundry may be removed by a friction between the drum and the washing water.

A lifter configured to help the washing of laundry by the rise and fall of the laundry during the rotation of the drum may be located on an inner circumferential surface of the washer drum. The lifter may help the washing of laundry while lifting up and then dropping the laundry as the drum rotates after putting detergent, washing water and laundry into the drum. The lifter may be located within the drum to prevent the damage of laundry, reduce water usage, and cause knocking, rubbing, and washing of the laundry. The lifter may be attached to an inner circumferential surface of the drum to accommodate water into an inner space of the lifter and then perform the role of spraying water to laundry within the drum.

A lifter in the related art may be typically coupled to the drum through an additional fastening member, thereby causing a performance deterioration of the lifter due to a defect or failure of the fastening member. Furthermore, water introduced into the lifter may be distributed through a fastening portion between the drum and the lifter, thereby causing unnecessary discharge of washing water.

Consequently, it may be required to have a lifter with a structure capable of preventing water accommodated into the lifter from being discharged through a coupling portion between the drum and the lifter as well as not causing the performance deterioration of the lifter due to a coupling between the drum and the lifter. The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
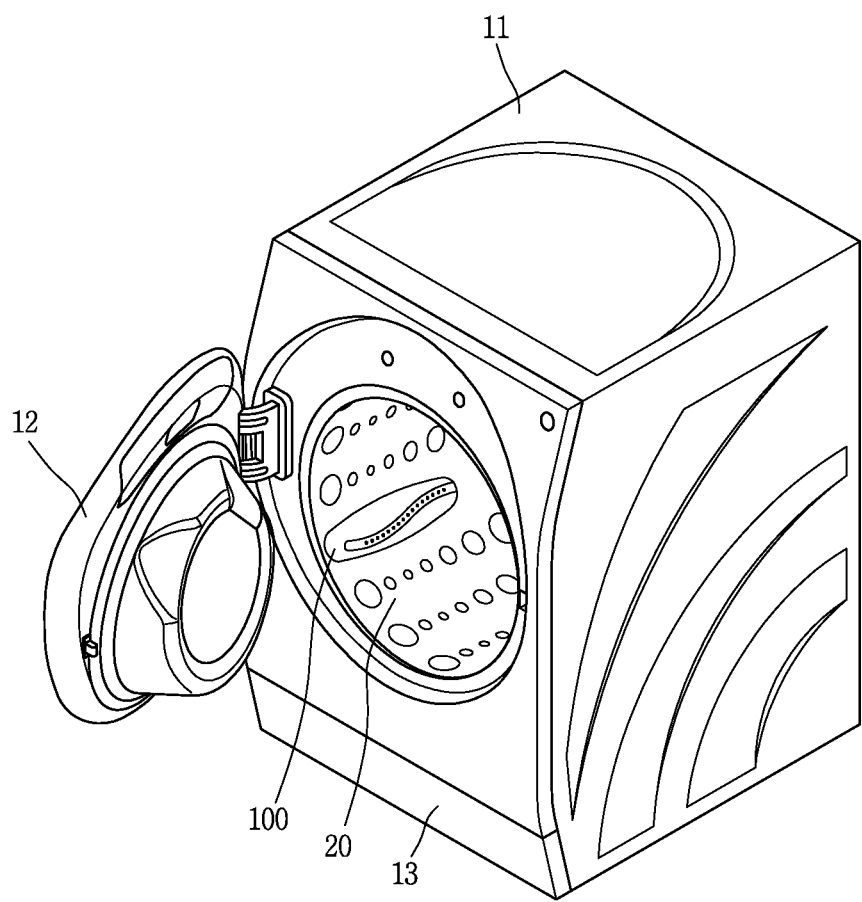
FIG. 1 is a perspective view illustrating the entire structure of a laundry treating apparatus.

Referring to FIG. 1, the laundry treating apparatus may include a laundry treating apparatus body 11 configured to form an appearance, a drum 20 rotatably mounted within the body 11 to put laundry thereinto, a lifter 100 provided within the drum 20, a door 12 provided on a front surface of the body 11, and a detergent inlet cover 13 covering a detergent inlet for adding detergent located at a lower portion of the body 11. Furthermore, the laundry treating apparatus may include a duct, a heat exchanger, and the like therein to circulate air to dry laundry within the drum.

The lifter 100 may be provided on an inner circumferential surface 22 of the drum 20 to help the washing of laundry due to the rise and fall of the laundry during the rotation of the drum 20. The lifter 100 may help the washing of laundry while lifting up and then dropping the laundry as the drum 20 rotates after putting detergent, washing water, and laundry into the drum 20. The lifter 100 may prevent laundry within the drum 20 from getting tangled to prevent the damage of laundry, reduce water usage, and cause knocking, rubbing, and washing of the laundry.

Figure 2:
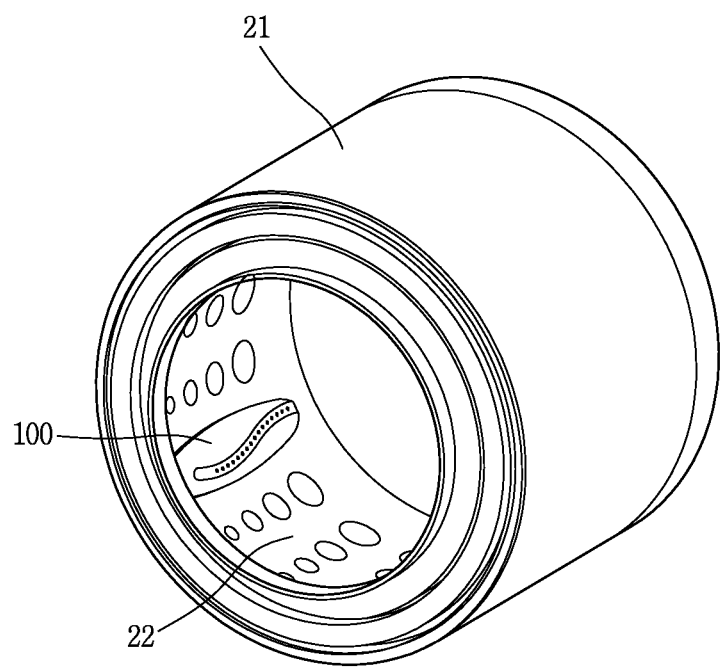
FIG. 2 is a perspective view illustrating a lifter attached to an inner circumferential surface of a drum.

Referring to FIG. 2, the lifter 100 may extend along a direction parallel to a rotational axis of the drum, and may be provided along an inner circumferential surface 22 of a drum body 21. A plurality of lifters 100 may be typically provided on the inner circumferential surface 22 of the drum, but when the lifters 100 are asymmetrically provided based on a rotational axis of the drum, vibration and noise may occur as the drum rotates, and thus the plurality of lifters 100 may be preferably provided at predetermined angles around the rotational axis of the drum.

Figure 3:
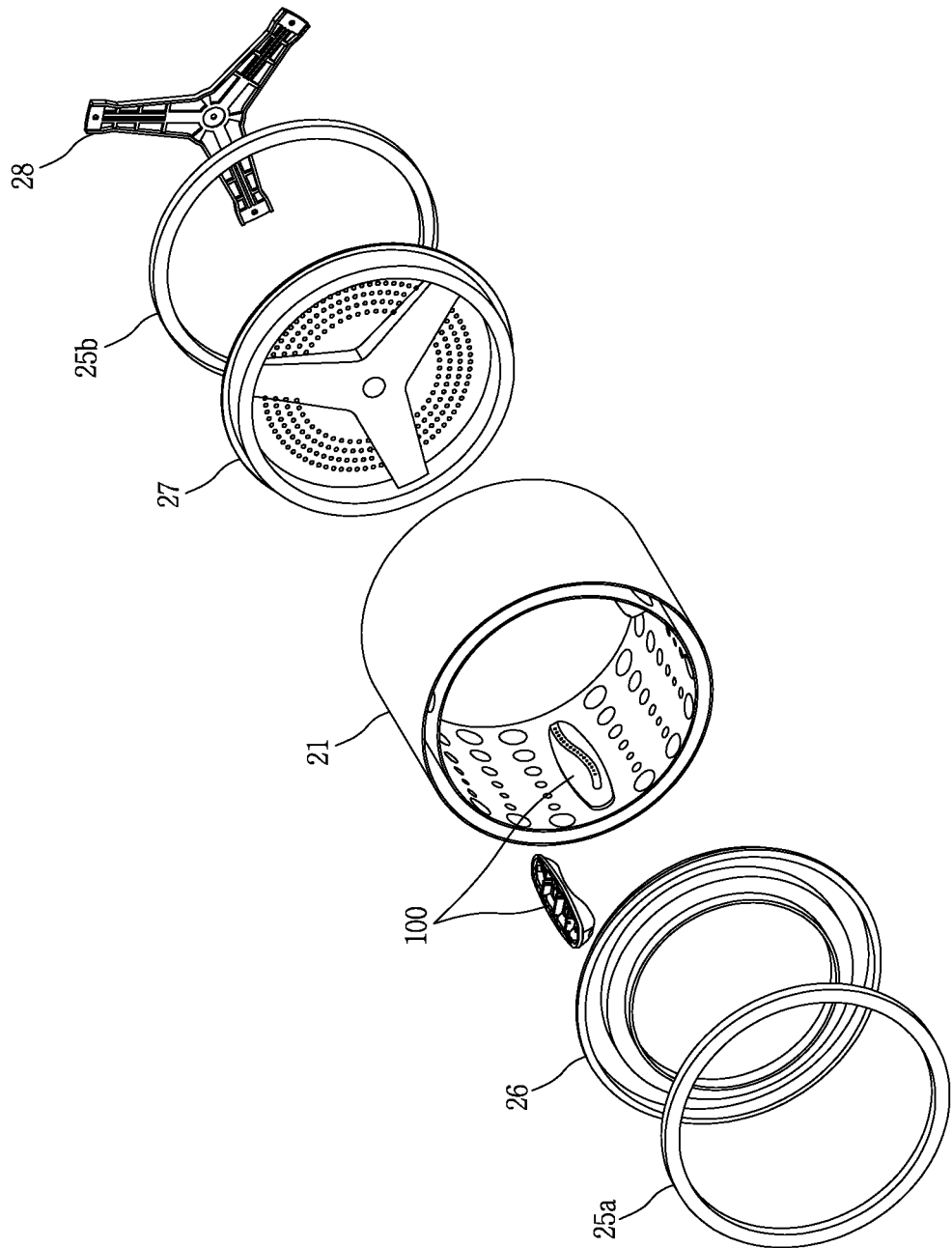
FIG. 3 is an exploded view illustrating the internal structure of a drum including the drum and a lifter attached to the drum.

Referring to FIG. 3, the drum may include a front drum member 26, the drum body 21, the lifter 100, a rear drum member 27, a balancer 25a, 25b, and a spider 28, and when those members are sequentially coupled as illustrated in FIG. 3, they have a shape of drum in FIG. 2. Considering the role of each member constituting the drum disclosed in FIG. 3, the balancer 25a, 25b may suppress vibration as the drum rotates, and the spider 28 may provide a rotational force of the drum. The lifter 100 may lift up and then drop laundry within the drum as disclosed above, thereby enhancing washing performance through a fall head.

Figure 4:
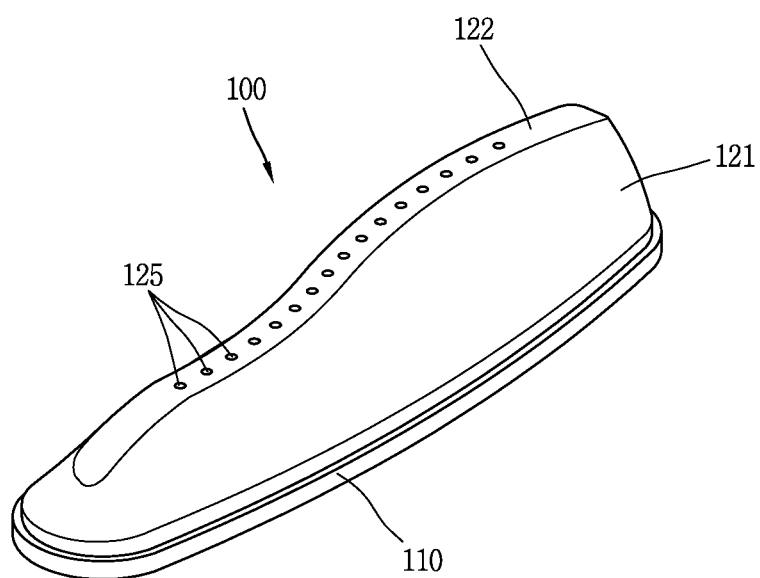
FIG. 4 is a perspective view in which the lifter is seen from an inside of the drum.

As illustrated in FIG. 4, the lifter 100 may be formed by coupling a first member (or lifter base) 110 to a second member (or lifter top) 120, and the second member 120 may be located on the first member 110. The lifter 100 may have a streamlined or S-shape, and have a nonlinear structure twisted by a predetermined angle. Through this, washing water within the drum may more efficiently flow by the lifter 100 as the drum rotates.

Figure 5:
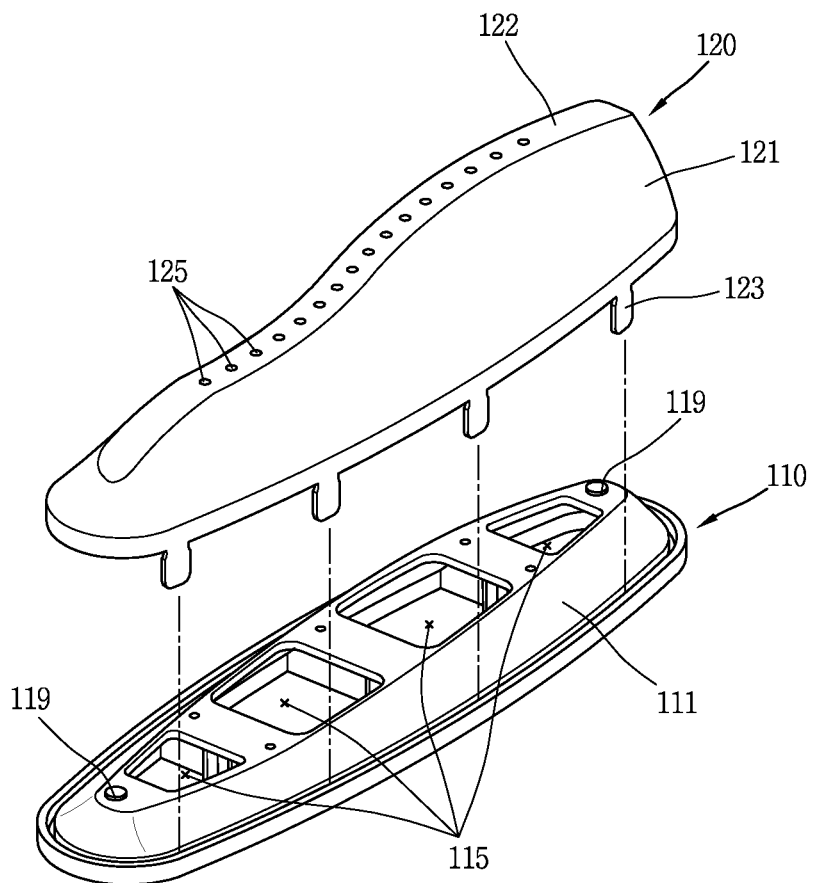
FIG. 5 is an exploded view illustrating the entire structure of the lifter.
Figure 6:
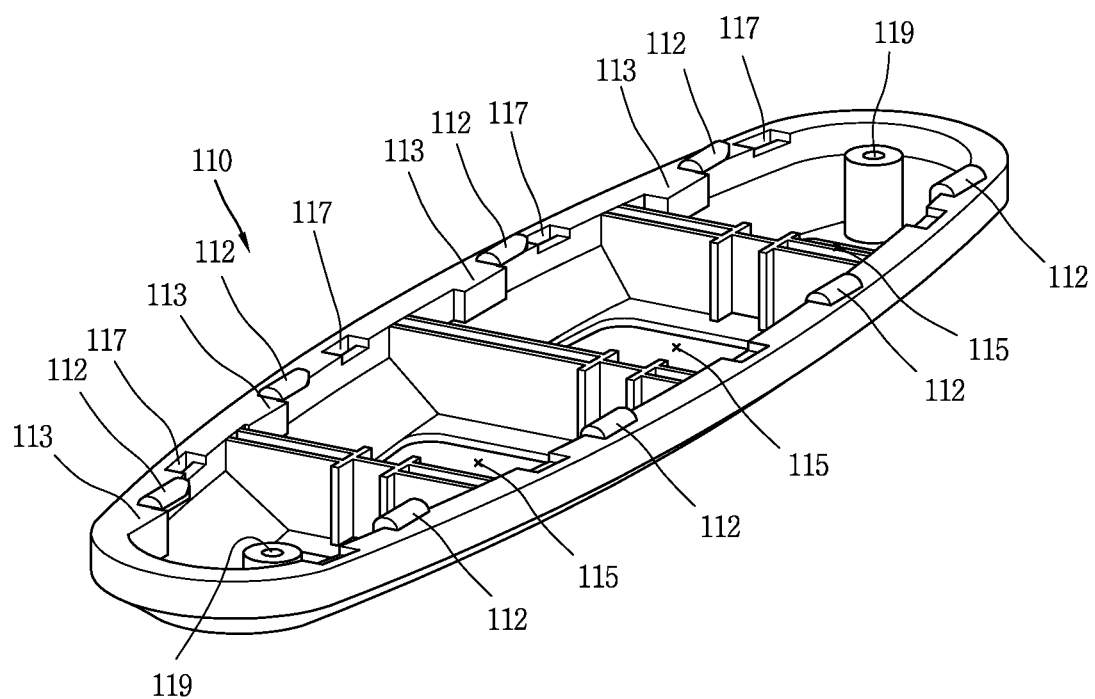
FIG. 6 is a perspective view illustrating a first member constituting the lifter.

First, the first member 110 will be considered through a lower end portion of FIG. 5 and FIG. 6. An upper surface of the first member 110 is illustrated at a lower portion of FIG. 5, and a lower surface of the first member 110 is illustrated in FIG. 6. The first member 110 may include a body 111, a hook portion (or hook) 112, a shielding portion (or shield) 113, a mounting hole 117, a washing water inlet hole 115a, and a screw insertion hole 119.

The body 111 of the first member may form an entire structure of the first member 110, and may extend in a direction in parallel to a rotational axis of the drum. The body 111 may also be provided on an inner circumferential surface 22 of the drum in parallel to the rotational axis of the drum.

The first member 110 may include a washing water inlet portion (or washing water inlet) 115. The washing water inlet portion 115 may include a hole through the first member 110 to introduce washing water into the lifter 100. The washing water inlet portion 115 may overlap with part of a hole formed on the drum.

The washing water inlet portion 115 may include a plurality of washing water inlet holes 115a. As illustrated in FIG. 5, the washing water inlet holes 115a may be separated from one another in a direction in parallel to a rotational axis of the washer drum, and may pass through the first member 110. Washing water may be introduced into the drum from a tub as the drum rotates during the washing process of the laundry treating apparatus, and the washing water introduced through holes formed on the drum may be introduced into the lifter 100 through the washing water inlet holes 115a, respectively, overlapping with the holes formed on the drum.

The screw insertion hole 119 may be formed at one side of the first member 110 to be affixed to the drum. The first member 110 may be fixed to an inner surface of the drum through the screw insertion hole 119 by screw fastening. The screw insertion holes 119 may be formed at both ends of the first member 110 as illustrated in FIG. 5, and the plurality of screw insertion holes 119 may be located between the washing water inlet holes 115a of the first member 110. The screw insertion hole 119 may have a typical shape into which a screw may be inserted.

Looking at a rear surface of the first member 110, the first member 110 may include a mounting hole 117, a hook portion 112 and a shielding portion 113. The mounting hole 117 may couple the first member 110 to the second member 120, and a protruding portion (or tab) 123 of the second member 120 may be inserted into the mounting hole 117, thereby coupling the first member 110 to the second member 120.

Figure 7:
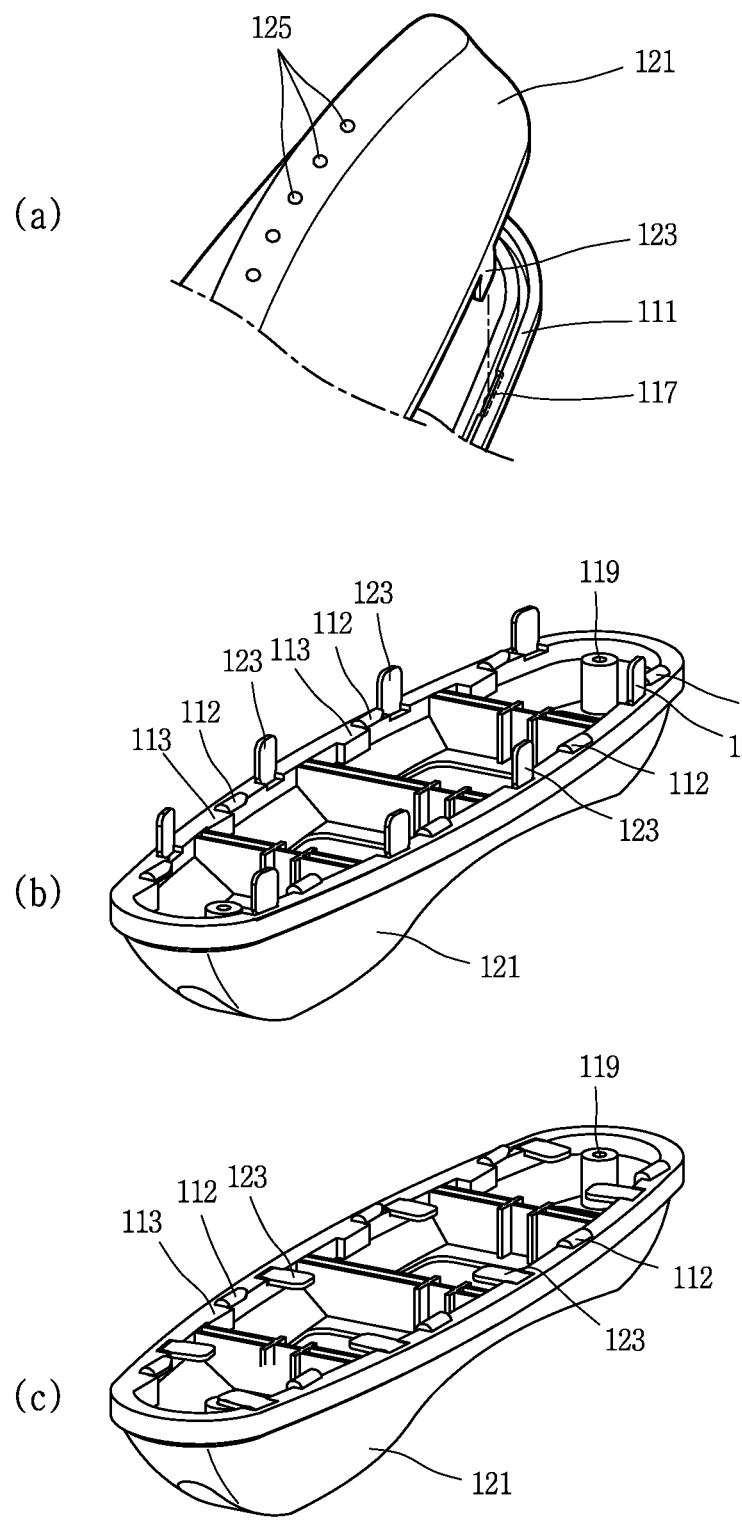
FIG. 7 shows views illustrating a shape in which a protruding portion of a second member is inserted into a mounting hole of the first member (shown on top with label (a)); a shape in which a protruding portion of a second member is inserted and coupled to a mounting hole of the first member (shown in the middle with label (b)); and a shape in which a protruding portion of a second member is inserted into a mounting hole of the first member and then bent (shown on bottom with label (c))

Referring to FIG. 7, the mounting hole 117 may be formed along a circumference of the first member 110, and may have a corresponding shape to allow the protruding portion 123 of the second member 120 to be inserted thereinto. The mounting holes 117 may be located at a plurality of positions along a circumference of the first member 110.

The hook portion 112 may protrude and be formed along a circumference of a lower surface of the first member 110 to fix the first member 110 to the drum. The hook portion 112 may have a shape of a ring portion to support one side of the drum when inserted and then may be slid as illustrated in FIG. 6.

The hook portion 112 may be inserted into a fastening hole located on the drum, and then slid and fixed to the drum to support one side of the drum. A plurality of hook portions 112 may be located along a circumference of the first member 110 as illustrated in FIG. 6, and located to face each other. The hook portion 112 may be bent toward a central portion of the first member 110. The hook portion 112 may be inserted into a fastening hole 24 of the drum and then slid in one direction, and at least part of the hook portion 112 may cover the inner circumferential surface 22 of the drum.

The shielding portion 113 may protrude from and be formed at an inner side of the first member 110 to cover a portion of the fastening hole. The shielding portion 113 may completely cover the fastening hole when the hook portion 112 is inserted into the fastening hole and then slid in one direction. The shielding portion 113 may be formed at a first lateral side of the first member 110 to correspond to a rotational direction of the drum to prevent washing water from being discharged through the fastening hole 24 of the drum. A plurality of shielding portions 113 may be separated from one another along the first lateral side circumference portion of the first member 110 in a direction of extending the first member 110.

A centrifugal force may be generated as the drum rotates, and the shielding portion 113 covering the fastening hole may be located relatively far away based on a rotational direction of the drum. Thus, washing water accommodated in the lifter 100 may not be discharged despite rotation of the drum. In other words, as illustrated in FIG. 6, the shielding portion 113 may be formed only in one direction based on a major axis passing through a center of the first member 110 having an elliptical shape.

The hook portion 112 protruding from and formed at an inner side of the first member 110 inserted into the fastening hole and slid in one direction to cover only part of the fastening hole 24 of the drum may be formed at a second lateral side of the first member 110 at which the shielding portion 113 is not located. As illustrated in FIG. 6, the shielding portion 113 may not be formed at the second lateral side based on the major axis of the first member 110. Accordingly, part of washing water may be introduced into the lifter 100 through a portion of the fastening hole 24 of the drum. The first member 110 may be formed of synthetic resin, and for example, the first member 110 may be formed of injected plastic. However, the present disclosure may not be necessarily limited to that material.

Considering the second member 120 through FIG. 5, the second member 120 may include a body 121, the protruding portion 123 and a washing water discharge hole 125. The body 121 of the second member 120 may protrude from and be formed at an inside of the drum to accommodate washing water in an inner space. The body 121 of the second member 120 may have a nonlinear shape.

A plurality of protruding portions 123 may be formed along a lower circumference of the body 121. The protruding portion 123 of the second member 120 may be inserted into the mounting hole 117 formed along a circumference of the first member 110, and thus the first member 110 may be coupled to the second member 120. As illustrated in FIG. 5, the protruding portion 123 may be formed at a lower portion of the body 121 of the second member 120, and extend toward a lower portion from an upper portion.

The washing water discharge hole 125 may be located at an upper portion of the body 121 to discharge washing water accommodated in the body 121 of the second member 120 from an outside of the drum, and formed in one direction. Specifically, an upper surface 122 of the second member body 121 extended along one direction may be located at an upper portion of the body 121 of the second member 120, and a plurality of washing water discharge holes 125 are formed on the upper surface 122 of the body 121 of the second member 120. Washing water accommodated in the lifter 100 may be discharged toward the drum through the washing water discharge holes 125 to help wash the laundry accommodated within the drum. Furthermore, water usage during the washing process may be reduced by supplying water into the drum through the lifter 100.

As illustrated in FIG. 7, part (a), the protruding portion 123 of the second member 120 may be inserted into the mounting hole 117 of the first member 110, and a plurality of protruding portions 123 formed on the second member 120 may be inserted into a plurality of mounting holes 117 formed on the first member 110 at the corresponding positions, thereby coupling the first member 110 to the second member 120. As illustrated in FIG. 7, part (b), the protruding portion 123 of the second member 120 may be inserted into the mounting hole 117 of the first member 110 such that the first member 110 is located at an upper portion of the lifter and the second member 120 is located at a lower portion of the lifter. Moreover, the protruding portion 123 of the second member 120 may be inserted into the mounting hole 117 of the first member 110 and protruded upward.

As illustrated in FIG. 7, part (c), the protruding portion 123 of the second member 120 inserted into the mounting hole 117 of the first member 110 may be bent to be fixed. The protruding portion 123 of the second member 120 inserted into the mounting hole 117 of the first member 110 and protruded upward may be bent to be coupled between the first member 110 and the second member 120. The protruding portion 123 may be bent in an inward direction of the first member 110. In other words, the protruding portion 123 of the second member 120 may be inserted and then bent to the mounting hole 117 of the first member 110, thereby coupling the first member 110 to the second member 120.

Figure 8:
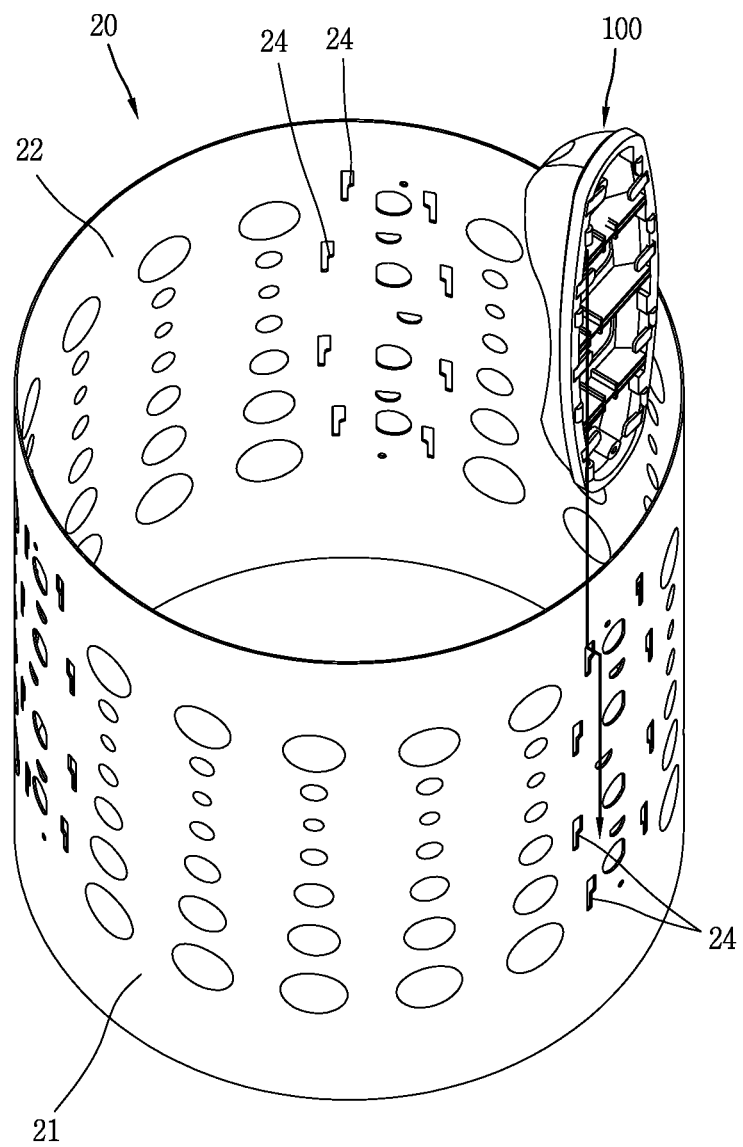
FIG. 8 illustrates a shape in which the lifter is coupled to the drum.

As illustrated in FIG. 8, a plurality of fastening holes (or coupling holes) 24 to fix the lifter 100 may be located on the drum, and the hook portion 112 of the first member 110 of the lifter 100 may be inserted into the fastening hole 24 of the drum and then slid. A screw may then be fastened to the screw insertion hole 119 located at upper and lower portions of the first member of the lifter 100, thereby fixing the lifter 100 to the drum.

Figure 9:
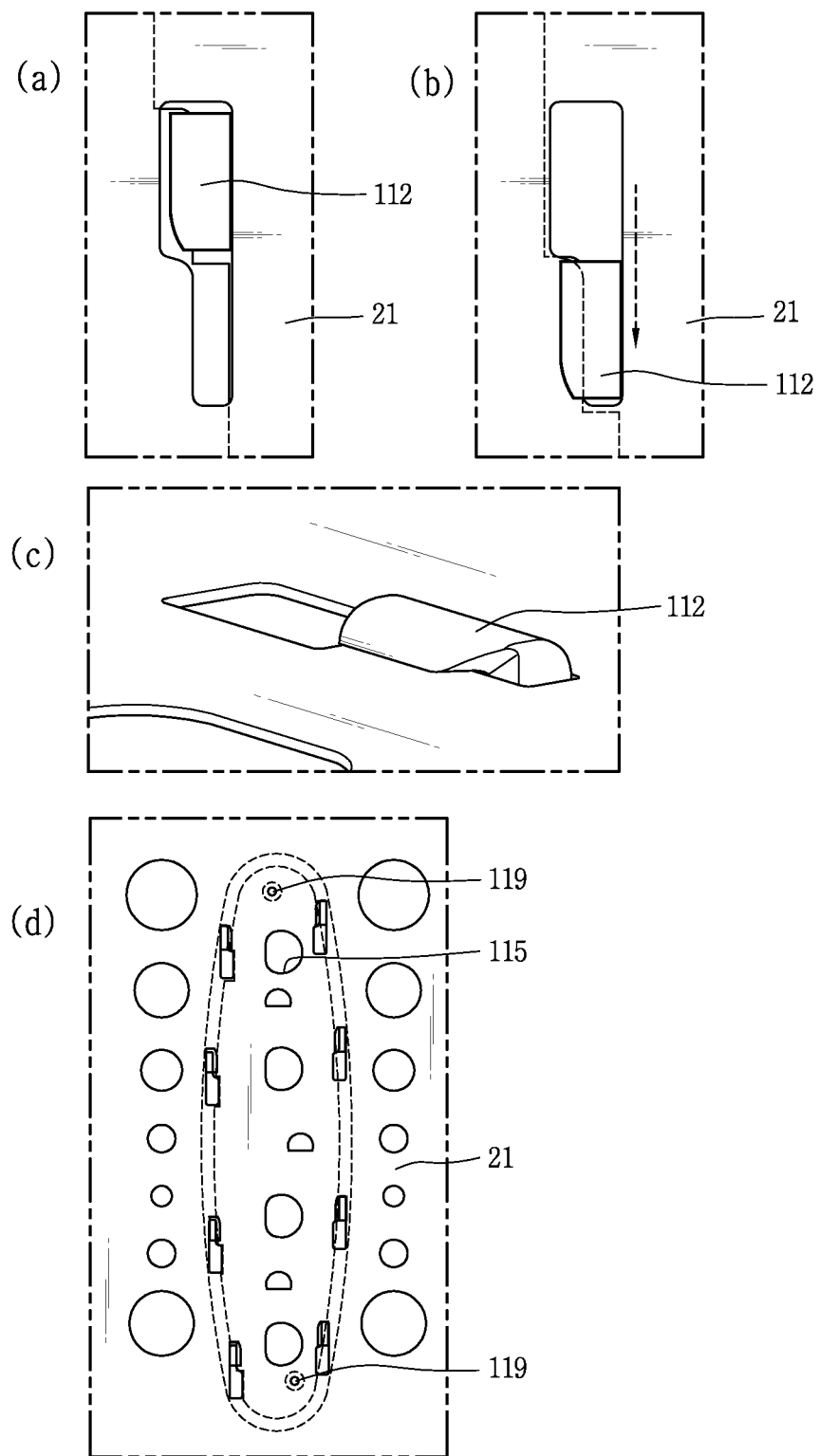
FIG. 9 shows views illustrating a shape in which a hook portion of the first member is inserted into a fastening hole of the drum (shown on top left with label (a)); a shape in which the hook portion is slid (shown on top right with label (b)); a shape in which the hook portion is slid and then coupled to the drum (shown in the middle with label (c)); and a shape in which the lifter is coupled to an inner circumferential surface of the drum is seen from an outside of the drum (shown on bottom with label (d))

Referring to FIG. 9, part (a), the hook portion 112 of the first member 110 may be inserted into the fastening hole 24 of the drum. The hook portion 112 of the first member 110 may be inserted into the fastening hole 24 of the drum to fix the lifter 100 to the drum.

Referring to FIG. 9, part (b), the hook portion 112 may be slid. The hook portion 112 of the first member 110 may be inserted into the fastening hole 24 of the drum, and then slid along an arrow direction on the drawing. The hook portion 112 may have a shape of a ring portion to support one side of the drum, and the hook portion 112 may be slid to support one side of the drum and thus be more closely fixed to the drum.

Referring to FIG. 9, part (c), the hook portion 112 may be slid and then coupled to the drum. As illustrated in the drawing, the hook portion 112 may support the drum body 21. Specifically, the hook portion 112 of the first member 110 may cover at least part of outer and inner circumferential surfaces of the drum.

Referring to FIG. 9, part (d), a shape in which the lifter 100 is coupled to an inner circumferential surface 22 of the drum is seen from an outside of the drum. As illustrated in the drawing, part of the drum body 21 may be supported by each hook portion 112 located on the first member 110, and the shielding portion 113 of the first member 110 is may cover on a fastening hole on the left. The drum body 21 may be fixed to the screw insertion hole 119 located on the first member 110 by screw fastening, thereby locating the lifter 100 on an inner circumferential surface of the drum.

Figure 10:
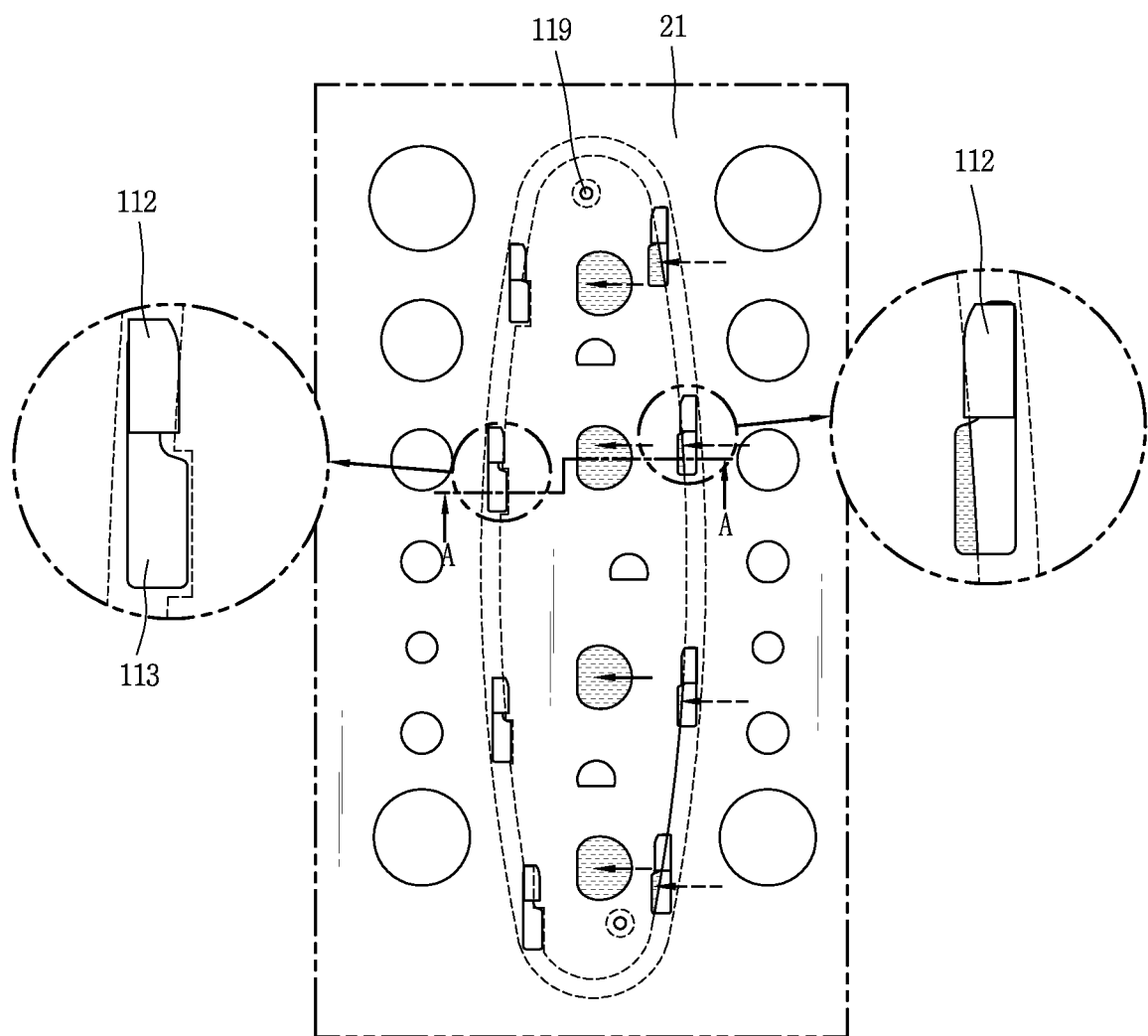
FIG. 10 illustrates a shape in which the lifter is coupled to an inner circumferential surface of the drum and its enlarged shape.

Referring to FIG. 10, the lifter 100 and the drum may be coupled to each other via the hook portion 112 of the first member 110 and screw fastening. The hook portion 112 of the first member 110 may support part of the inner circumferential surface 22 and outer circumferential surface of the drum, and may be coupled to the drum by inserting a screw into the screw insertion hole 119 of the first member 110.

When each hook portion 112 of the first member 110 is inserted into each fastening hole of the drum and then slid, the shielding portion 113 of the first member 110 may cover the fastening hole 24 of the drum. The shielding portion 113 may completely cover the fastening hole when the hook portion 112 is inserted into the fastening hole and then slid in one direction, thereby preventing washing water from being discharged. The first member 110 having an elliptical shape has a major axis, and the fastening hole may be completely covered through the shielding portion 113 of the first member 110 on the left based on the major axis.

Looking at an enlarged view on the left in FIG. 10, the shielding portion 113 may be located at a lower end of the hook portion 112 to cover the fastening hole 24 of the drum. The shielding portion 113 may protrude from and be formed toward an inner side of the first member 110 along one side circumference of the first member 110, and the shielding portion 113 may completely cover a corresponding fastening hole 24 of the drum to thereby prevent washing water introduced into the lifter 100 through an opposing fastening hole 24 of the drum from being discharged to an outside of the lifter 100.

Looking at an enlarged view on the right in FIG. 10, part of the fastening hole 24 of the drum may be exposed on the right based on the major axis of the first member 110. The shielding portion 113 may not be formed on the right based on the major axis passing through a center of the first member 110, and thus a portion of the fastening hole may be exposed to an outside at a side on which the shielding portion 113 is not formed, thereby introducing part of washing water into the lifter 100 through that portion. For washing water flowing along an arrow direction of FIG. 10, the washing water inlet hole 115a and the shielding portion 113, formed to overlap with the fastening hole 24 of the drum, may not be located, and thus part of the washing water may be introduced into the lifter 100 through part of the fastening hole exposed to an outside of the lifter 100.

Figure 11:
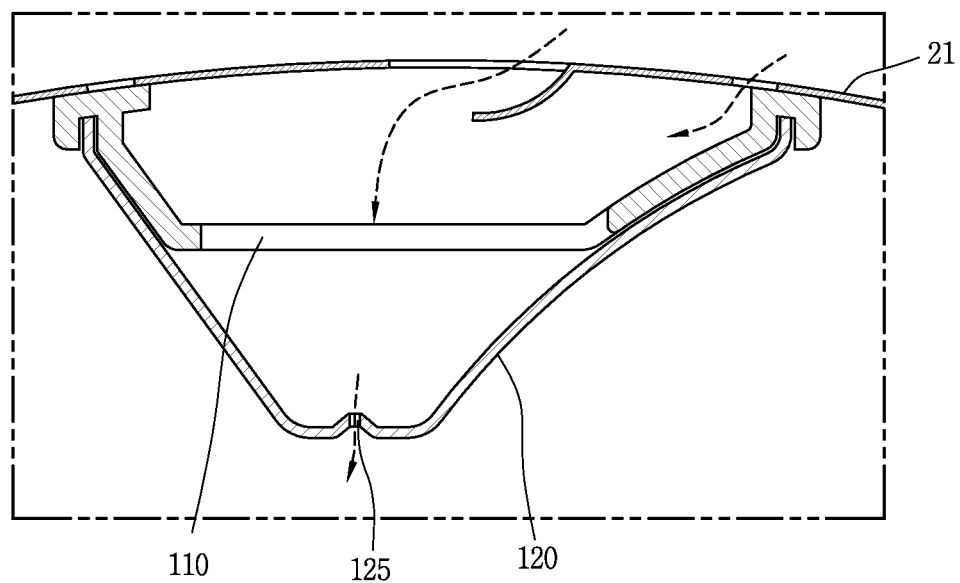
FIG. 11 is a view in which the drum is seen from a front side of the body.

Referring to FIG. 11, when the drum rotates, washing water may be introduced into the drum from a tub surrounding the drum. The washing water may be partly accommodated even in the lifter 100 attached to the inner circumferential surface 22 of the drum, and may pass through a hole of the drum and be discharged into the drum through the washing water discharge hole 125 of the second member 120 through the washing water inlet hole 115a of the first member 110 overlapping with the hole of the drum. Alternatively, part of the washing water may be introduced into the lifter 100 even through the fastening hole on which the shielding portion 113 is not located. An arrow in FIG. 11 indicates a moving direction of washing water.

Figure 12:
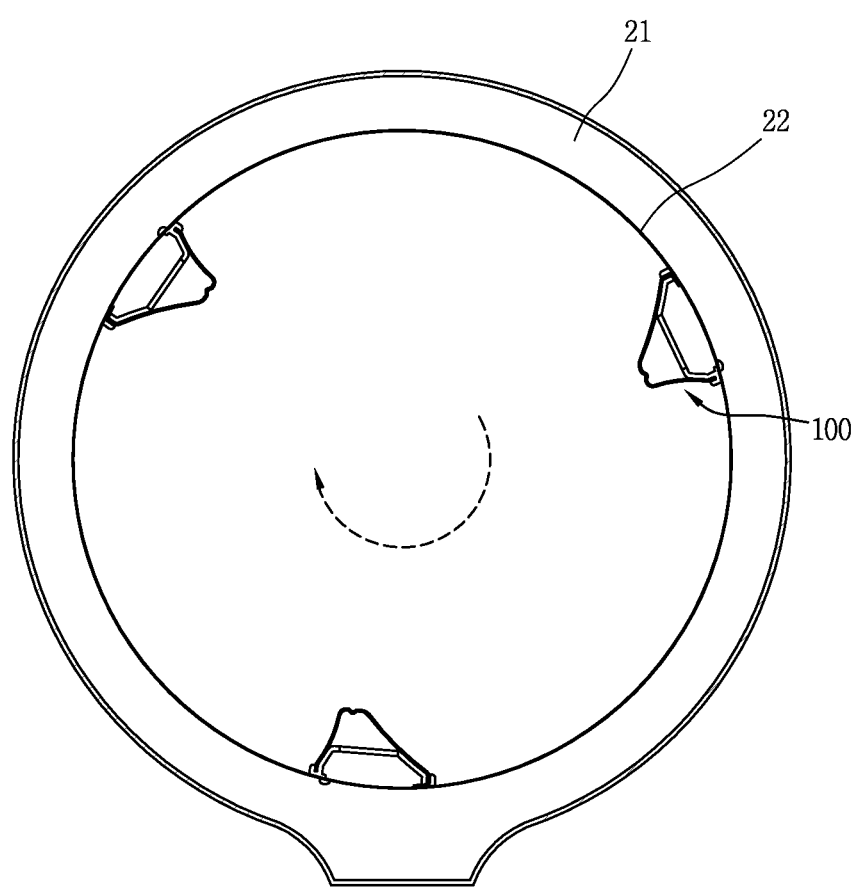
FIG. 12 illustrates a shape in which washing water is introduced into the lifter and then discharged into the drum through a washing water discharge hole.

Referring to FIG. 12, a plurality of lifters 100 may be provided along the inner circumferential surface 22 of the drum. Unless the lifters 100 are not symmetrically arranged based on a rotational axis of the drum, there is a concern that noise and vibration may occur as the drum rotates, and laundry may not be uniformly lifted up and thus washing may not be uniformly carried out on the entire laundry. Accordingly, a plurality of lifters 100 may be symmetrically located based on the rotational axis of the drum as illustrated in FIG. 12. Laundry within the drum may be caught in the lifters 100 to be effectively lifted up to a predetermined height, and washing water within the drum may more efficiently flow to enhance a washing effect.

The configurations and methods according to the above-described embodiments will not be limited to the foregoing lifter 100 for a laundry treating apparatus, and configured to make various modifications thereto. An object of the present disclosure is to propose a lifter having a structure capable of being attached to an inner surface of a drum.

Another object of the present disclosure is to propose a lifter having a structure capable of being firmly coupled to an inner surface of a drum. Still another object of the present disclosure is to propose a lifter having a structure capable of reducing washing water accommodated therein from being discharged through a fastening portion between a drum and a lifter.

A lifter for a laundry treating apparatus according to an embodiment of the present disclosure may include a first member mounted at an inner side of a drum; and a second member mounted on the first member and protruded toward an inside of the drum, wherein the first member includes a hook portion protruded and formed along a circumference of the first member, at least part of which is disposed to cover an inner circumferential surface of the drum when inserted into a fastening hole of the drum and then slid in one direction; and a shielding portion protruded and formed at an inner side of the first member and configured to completely cover the fastening hole when the hook portion is inserted into the fastening hole and then slid in one direction. The shielding portion may be formed at one side of the first member to correspond to a rotational direction of the drum to prevent washing water from being discharged through the fastening hole.

A plurality of shielding portions may be disposed to be separated from one another along one side circumference of the first member. The other side of the first member may protrude from and be formed at an inner side of the first member and configured to cover only part of the fastening hole when the hook portion is inserted into the fastening hole and then slid in one direction so as to allow the introduction of washing water.

The first member may include a washing water inlet portion formed to overlap with part of a hole formed on the drum to introduce washing water. The washing water inlet portion may include a plurality of washing water inlet holes disposed to be separated from one another along a direction in parallel to a rotational axis of the washer drum.

A lifter for a laundry treating apparatus according to an example associated with the present disclosure may include a first member mounted at an inner side of a drum; and a second member mounted on the first member and protruded toward an inside of the drum, wherein the second member includes a body protruded toward an inside of the drum to accommodate washing water therein; and a plurality of protrusion portion located along a lower circumference of the body. Furthermore, a plurality of mounting holes into which protrusion portions of the second member are inserted to be coupled to the second member may be formed on the first member along a lower circumference.

A protruding portion of the second member may be inserted into a mounting hole of the first member and the protruding portion may be bent to couple the first member to the second member. The second member may include a plurality of washing water discharge holes located at an upper portion of the body and formed along one direction to discharge washing water accommodated in the body from an outside of the drum.

A screw insertion hole may be formed at one side of the first member to fix the first member to an inner surface of the drum with screw fastening. The first member may be formed of stainless steel, and the second member may be formed of plastic.

A laundry treating apparatus according to the present disclosure may be inserted into a fastening hole of the drum through a hook portion to support an inner circumferential surface of the drum to be coupled to the drum, thereby preventing performance deterioration due to coupling to the drum. A laundry treating apparatus according to the present disclosure may prevent washing water accommodated within the lifter from being discharged to an outside by the shielding portion formed on the first member even when the drum rotates during the washing process, and thus prevent the unnecessary discharge of washing water and discharge the washing water through the washing water discharge hole, thereby maintaining the performance of the lifter.

Hereinafter, a lifter for a laundry treating apparatus associated with the present disclosure will be described in more detail with reference to the accompanying drawings. Even in different embodiments according to the present disclosure, the same or similar reference numerals are designated to the same or similar configurations, and the description thereof will be substituted by the earlier description. Unless clearly used otherwise, expressions in the singular number used in the present disclosure may include a plural meaning.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lifter for a laundry treating apparatus, the lifter comprising:
   a first body configured to be mounted on an inner circumferential surface of a drum; and
   a second body coupled to an upper side of the first body, and protruded toward an inside of the drum,
   wherein an upper portion of the first body has a water inlet configured to overlap with at least part of a hole passing through the inner circumferential surface of the drum and is spaced apart from an upper portion of the second body having a water discharge hole formed therein to form an inner space, and
   wherein the second body is inserted into a lower circumference of the first body and then passes through a mounting hole formed along the lower circumference of the first body.

2. The lifter of claim 1, wherein the water inlet comprises a plurality of water inlet holes.

3. The lifter of claim 2, wherein the respective water inlet holes are formed along a longitudinal direction of the first body, and are provided on an upper surface of the first body to be separated from one another in a direction parallel to a rotational axis of the drum.

4. The lifter of claim 1, wherein the first body comprises:
   a hook that protrudes toward the inner circumferential surface of the drum along a circumference of a bottom of the first body facing the inner circumferential surface of the drum and is configured to slide into a fastening hole formed in the drum; and
   a shield that protrudes from the bottom of the first body in a direction crossing the hook to cover the fastening hole, and is formed on a circumference of the bottom of the first body along an axial direction of the drum, wherein the shield covers the fastening hole when the first body is coupled to the inner circumferential surface of the drum.

5. The lifter of claim 4, wherein the shield is configured to cover the fastening hole when the hook is inserted into the fastening hole and slid in the axial direction of the drum.

6. The lifter of claim 5, wherein a plurality of the shields are provided and spaced apart from each other along the circumference of the bottom of the first body with respect to a rotational direction of the drum.

7. The lifter of claim 4, wherein the shield and the hook are adjacent to each other.

8. The lifter of claim 4, wherein the hook is configured to be inserted into the fastening hole of the drum and then slid in the axial direction of the drum to contact the inner circumferential surface and an outer circumferential surface of the drum, respectively.

9. The lifter of claim 8, wherein the hook is bent outward from the bottom of the first body.

10. The lifter of claim 8, wherein each of a plurality of hooks is inserted into each of a plurality of fastening holes and then slid to contact the inner and outer circumferential surfaces of the drum, respectively.

11. The lifter of claim 8, wherein a plurality of the hooks are positioned to be spaced apart along a rear portion of the first body, and each of the hooks is formed at an alternate position with respect to a center portion of the first body.

12. The lifter of claim 4, wherein the shield is formed such that rear portions of the first body protrude inward of the first body, and are disposed to be spaced apart from one another in a longitudinal direction of the first body.

13. The lifter of claim 12, wherein the shield supports the inner circumferential surface of the drum to completely cover the fastening hole formed in the drum together with the hook.

14. The lifter of claim 4, wherein the hook protrudes inward of the rear surface of the first body after protruding from the rear surface of the first body, and is inserted into the fastening hole of the drum so that the first body is supported on the inner circumferential surface and an outer circumferential surface of the drum.

15. The lifter of claim 1, wherein the upper portion of the first body has a continuous groove formed along the lower circumference of the first body such that a lower portion of the second body is configured to be inserted into the groove, and, when the lifter is coupled to the inner circumferential surface of the drum, a portion of the first body is exposed between the inner circumferential surface of the drum and the second body.

16. The lifter of claim 1, wherein the water discharge hole is formed on a surface of the second body.

* * * * *